United States Patent [19]

Langley et al.

[11] Patent Number: 4,807,745
[45] Date of Patent: Feb. 28, 1989

[54] BARRIER SEALED PACKAGES FOR CIGARETTES AND OTHER SMOKING ARTICLES

[75] Inventors: William H. Langley; Roy E. Yeatts; Carl C. Hein, III, all of Winston-Salem; Matthew S. Koschak, Pfafftown, all of N.C.

[73] Assignee: R. J. Reynolds Tobacco Company, Winston-Salem, N.C.

[21] Appl. No.: 183,429

[22] Filed: Apr. 18, 1988

Related U.S. Application Data

[63] Continuation of Ser. No. 127,019, Nov. 27, 1987.

[51] Int. Cl.⁴ .............................................. A24F 15/00
[52] U.S. Cl. .................................... 206/245; 206/484; 229/3.5 R; 428/461; 428/462
[58] Field of Search ............ 206/242, 245, 484, 484.2, 206/524.2; 229/3.5 R, 3.5 MF, 87 C; 428/458, 461, 462

[56] References Cited

U.S. PATENT DOCUMENTS

| | | | |
|---|---|---|---|
| 2,295,231 | 9/1942 | Milmoe et al. | 229/51 |
| 3,265,287 | 11/1964 | Hovland | 206/245 |
| 3,355,348 | 11/1967 | Lamar | 229/3.5 MF |
| 3,553,550 | 10/1970 | Benzon-Petersen | 206/245 |
| 3,616,190 | 10/1971 | Shaw | 206/245 |
| 3,770,122 | 11/1973 | Thiele | 229/3.5 MF |
| 3,948,389 | 4/1976 | Molins | 206/245 |
| 4,121,713 | 10/1978 | Focke et al. | 206/274 |
| 4,216,268 | 8/1980 | Stillman | 428/424.8 |
| 4,224,367 | 9/1980 | Scholls | 428/76 |
| 4,241,130 | 12/1980 | Barnes | 428/216 |
| 4,268,531 | 5/1981 | Whiting, Jr. | 428/476.9 |
| 4,284,672 | 8/1981 | Stillman | 428/476.3 |
| 4,303,155 | 12/1981 | Focke et al. | 206/264 |
| 4,327,150 | 4/1982 | White et al. | 428/462 |
| 4,349,402 | 9/1982 | Parker | 229/87 C |
| 4,375,260 | 3/1983 | Focke et al. | 206/264 |
| 4,387,126 | 6/1983 | Rebholz | 229/3.5 MF |
| 4,559,266 | 12/1985 | Misasa et al. | 428/424.8 |
| 4,661,414 | 4/1987 | Kowalski | 428/513 |
| 4,699,830 | 10/1987 | White | 428/461 |

Primary Examiner—David T. Fidei
Attorney, Agent, or Firm—Stephen M. Bodenheimer, Jr.

[57] ABSTRACT

The invention is directed to a packaging composite for barrier sealed cigarette or other smoking article packages. The composite includes a foil layer, exterior and interior skin layers of heat-sealable thermoplastic polymer, first and second biaxially oriented polypropylene homopolymer layers located between the exterior skin layers and the foil layers, and first and second adhesive layers coupling the polypropylene layers to the foil layer on each side thereof. The package laminate has a thickness of between 1.5 and 2.5 mils.

19 Claims, 2 Drawing Sheets

BARRIER SEALED PACKAGES FOR CIGARETTES AND OTHER SMOKING ARTICLES

This is a continuation of co-pending application Ser. No. 07/127,019 filed on 11/27/87.

FIELD OF THE INVENTION

The invention relates to barrier sealed packages for cigarettes and other smoking articles and to packaging laminates therefor. More specifically, the invention relates to packaged cigarettes and other smoking articles having a sealed barrier packaging either as a package inner liner or as a package overwrap and to heat sealable barrier packaging laminates therefor.

BACKGROUND OF THE INVENTION

Current cigarette packages are designed to protect cigarettes from the atmosphere and humidity in order to maintain freshness of the product. These packages include three different wrappings; an interior foil inner liner folded around the cigarettes, which is not sealed; a soft or hard paper or paperboard package; and a sealed transparent exterior overwrap which is typically composed of so-called oriented polypropylene which may consist of a heat-seal modified oriented polypropylene; acrylic heat-seal coated polypropylene or a coextruded ABA type film wherein the A layers are fusion heat sealable polypropylene/polyethylene copolymer and the B layer is oriented homopolymer of polypropylene.

Under normal climatic conditions and assuming a normal shelf life, the current packages maintain satisfactory freshness of cigarettes. However, when stored under various hot and/or dry conditions or for long periods of time, the package structure can be inadequate to protect freshness of cigarettes. In addition, the cigarettes and other smoking articles of the type disclosed in U.S. patent application Ser. No. 650,604 to Sensabaugh et al, and U.S. patent application Ser. No. 791,721, filed Oct. 28, 1985, to Clearman et al, and assigned to present assignee, are substantially more sensitive to moisture than current cigarettes. The preferred cigarette embodiments described in the aforesaid Clearman U.S. patent application produce a smoke-like aerosol from an aerosol forming material. In some instances, the aerosol former can be a hygroscopic material and the sorption of water by the aerosol former is functionally undesirable.

Various packaging overwraps and inner liners have been proposed for improving the barrier properties of current cigarette packages. For example, U.S. Pat. No. 3,948,389 to Molins et al discloses an air impervious inner liner for a cigarette package wherein an air impervious tube is sealed flat with the resulting margin and triangulated ends being folded against the packet. Because of an unusual end flap structure, the packages cannot be sealed by current cigarette manufacturing equipment.

U.S. Pat. No. 4,375,260 to Focke et al discloses a laminated foil inner liner which, as with the above Molins et al patent has an unusual end flap structure. The structure cannot be made by current cigarette packaging equipment. Additionally, the easy opening pre-perforated feature of this inner liner can result in severing of the foil layer thus reducing the barrier properties of the laminate.

It would be desirable to provide barrier sealed cigarette packages which can be manufactured using current cigarette packaging equipment or modified version thereof. Additionally, it would be desirable to provide a barrier package of cigarettes or other smoking articles which could be manufactured, i.e., folded and heat sealed, at rates approaching or equal to contemporary rates of cigarette package production. Additionally, it would be desirable to provide barrier sealed cigarette packaging having an appearance comparable to current cigarette packages and having outstanding barrier properties.

SUMMARY OF THE INVENTION

The invention provides a barrier sealed package which comprises a plurality of smoking articles, e.g., cigarettes, cigars, cigarillos, etc., sealed within a barrier composite. The package is of rectangular shape and has a heat sealed overlapping longitudinal side seal and heat sealed overlapping top and bottom folded end flap seals as in the current cigarette package. Alternatively, longitudunal overlap seals can be provided on the package top and bottom and folded end flap seals provided on the package sides. The barrier laminate has a thickness between about 1.5 and 2.5 mils and comprises a foil layer having a preferred thickness between about 0.25 mils and about 0.35 mils; exterior and interior surface skin layers of fusion heat sealable thermoplastic polymer having a softening point between about 165° F. and about 190° F., each of said surface layers having a thickness between about 0.05 and 0.1 mils; first and second biaxially oriented polypropylene homopolymer layers, in which the first polypropylene layer is located between the exterior skin layer and the foil layer, and the second polypropylene layer is located between the interior skin layer and the foil layer; and first and second adhesive layers, the first adhesive layer coupling the first polypropylene layer to the foil layer and the second adhesive layer coupling the second polypropylene layer to the foil layer on the other side thereof.

In various advantageous embodiments of the invention, the packaging laminate can include first and second adhesion promoter layers, the first adhesion promoter layer being adjacent the first polypropylene layer and lying between the first polypropylene layer and the first adhesive layer, and the second adhesive promoter layer being adjacent the second polypropylene layer and lying between the second polypropylene layer and the second adhesive layer.

Advantageously, the exterior and interior skin layers are thermoplastic materials having good hot tack and good slip and hot slip characteristics and have a softening temperature in the range of 170° to about 180° F., such as propylene/ethylene random copolymers or terpolymers of propylene, ethylene and a third comonomer. Advantageously, the exterior skin layer is optically clear.

The barrier laminate of the invention can be provided as an exterior overwrap for a soft or hard cigarette or other smoking article package. In this instance, the barrier laminate preferably includes a reverse printed layer visible from the outside of the barrier package, since the barrier itself is opaque due to the foil layer. The barrier laminate can also be provided as a sealed inner liner for a soft or hard cigarette or other smoking article package with, or without, a printing layer. The barrier laminate is preferably provided with a tear tape or other tear propagation feature for opening of the package and when constructed per the present invention provides a clean, straight tear line.

BRIEF DESCRIPTION OF THE DRAWINGS

In the drawings which form a portion of the original disclosure of the invention.

DESCRIPTION OF THE PREFERRED EMBODIMENT

Figure 1:
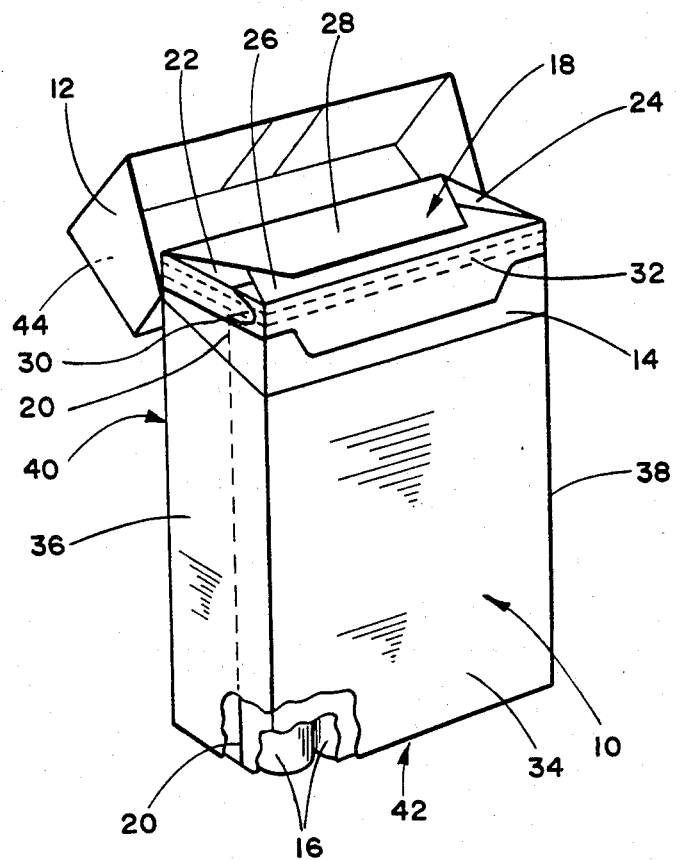
FIG. 1 is a front perspective view of a hard pack of barrier sealed cigarettes wherein the heat sealed barrier laminate is provided as a sealed inner liner.

FIG. 1 illustrates a hard pack comprising a sealed barrier inner liner according to the invention. Outer paperboard box 10 includes hinged lid 12 and retaining collar 14. Cigarettes 16 are sealed with an inner liner package 18.

Inner liner package 18 is fully heat sealed via side longitudinal seal 20 which extends from the top to the bottom of the inner liner. It will be recognized that the heat seal along line 20 is formed by heat sealing the interior surface of the laminate to an exterior surface thereof. The top folded end flaps of interior package 18 includes left and right tuck flaps 22 and 24, respectively, and front and back flaps 26 and 28, respectively. The bottom of the inner liner (not shown) has the same heat sealed structure as the top. A tear tape pull tab 30 is provided for tear tape 32 which is adhered to the inside of interliner 18 at the top thereof. Hard pack 10 includes front wall 34, left and right sidewalls 36 and 38, a back wall 40, a bottom 42, and top 44. These exterior surfaces of the hard pack can include printing. If desired, the hard pack can be provided with a clear protective overwrap of the type currently employed commercially.

Figure 1A:
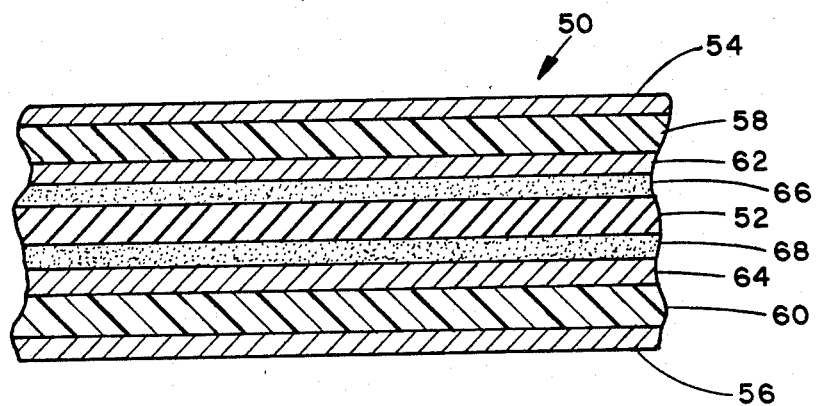
FIG. 1A is a cross sectional view of the inner liner barrier laminate used in the package of FIG. 1.

FIG. 1A is a cross sectional view of the barrier laminate used to form the inner liner shown in FIG. 1. Preferably, the laminate 50 is substantially symetrical around foil layer 52. Foil layer 52 preferably has a thickness ranging from about 0.25 to about 0.35 mils. Ultra-thin exterior and interior skin layers 54 and 56 are composed of a fusion heat sealable thermoplastic polymer having a softening point within the range of 165° F. and 190° F. By "fusion heat sealable", it is meant that the layer forms a fusion heat seal to itself upon the application of heat above the softening point and with pressure of the amount typically used for heat sealing, such as is well known to those skilled in the art. Layers 54 and 56 have a thickness ranging from 0.05 to about 0.1 mils, preferably between about 0.06 and about 0.08 mils. These layers can be composed of any of the optically clear heat sealable materials known to those skilled in the art and are preferably a polypropylene/polyethylene copolymer having 1-4 wt. % polyethylene or a terpolymer of polypropylene, polyethylene and a third comonomer.

Layers 58 and 60 are composed of biaxially oriented polypropylene homopolymer and have a thickness ranging from about 0.4 to about 1 mil, preferably from about 0.5 to about 0.8 mils. Advantageously, layers 58 and 60 are of about the same weight and thickness and the biaxially orientation of each is balanced, resulting in laminate 50 being cleanly tearable.

Adhesion promoter layers 62 and 64 are provided adjacent each of polypropylene layers 58 and 60 to promote good adhesion of the polypropylene layers to the foil layer 52. The adhesion promoter layers can be composed of any of various materials known to those skilled in the art such as polypropylene/polyethylene copolymers, terpolymers composed of polypropylene, polyethylene and a third copolymer, ethylene vinyl acetate, ethylene acrylic acetate, ethylene methylacylate, maleic anhydride grafted polymers, low density PE, and the like. Adhesive layers 66 and 68, respectively, are provided for bonding the polypropylene layers 58 and 60, respectively, to the foil layer. Adhesive layers can be of the solventless lamination such as hydroxyl terminated polyurethane with an isocyanate catalyst and the like or can be of the thermoplastic type (which includes a solvent) such as isocyanate terminated polyurethane with a high molecular weight polyol, polyesters, and the like.

Barrier laminate 50 has an overall thickness of between about 1.5 and about 2.5 mils, preferably between about 1.8 and about 2.2 mils. Advantageously, it is a substantially symetrical laminate, that is, orientation, weight and thickness of exterior layers 54, 58, 62 and 66 are substantially the same as corresponding interior layers 56, 60, 64 and 68. In preferred embodiments, the combination of exterior layers which overlie foil layer 52 are optically clear, thus giving a bright foil appearance to inner liner 18 (FIG. 1). Additionally, it is preferred that interior layers 56, 60, 64 and 68, underlying foil layer 52, are also optically clear.

In order to provide skin layers 54 and 56 of sufficient thinness, they are advantageously provided by coextrusion with layers 58 and 60 respectively. Thus, for example, layers 54 and 58 can be provided by coextruding a heat sealable polypropylene/polyethylene copolymer having 1-4 weight percent polyethylene onto polypropylene homopolymer. The coextruded layer is cooled and then formally oriented biaxially by various means known to those skilled in the art such as, for example, using a tenter frame or tubular process. Alternatively, the polypropylene homopolymer layer can be extruded; oriented in the machine direction and then coated with the heat-sealable skin layer and the resultant composite uniaxially oriented in the cross-machine direction. Advantageously, layers 54, 58 and 62 can be provided by coextruding three layers wherein layer 62 can be composed of the same or different thermoplastic heat sealable polymer as layer 54, thus providing for adhesion of polypropylene layer 58 to the foil layer via the #intermediate adhesive layer 66. Similarly, layers 56 and 60 can be provided by two-layer coextrusion or layers 56, 60 and 64 can be provided by three-layer coextrusion. During biaxially orientation, the thickness of the two or three-layer laminate is reduced thus providing the ultra-thin heat sealable skin layers 54 and 56 respectively.

Following formation of the interior and exterior coextrusions, described above, the coextrusion layers can be adhered to the inside foil layer 52 using adhesives according to well known processes known to those skilled in the art. In one such process, a coextrusion comprising layers 56, 60 and 64 is provided and biaxially oriented. Thereupon, a thermoplastic adhesive is provided as a coating on layer 64, e.g., by gravure rollers, which is thereafter heated to remove solvent and foil layer 52 is thereafter applied and coupled thereto via rollers. A solventless or thermoplastic adhesive is thereafter applied to the surface of the foil layer or other film which is then joined to previously provided biaxially oriented coextrusion which comprises layers 54, 58 and 62.

Figure 2:
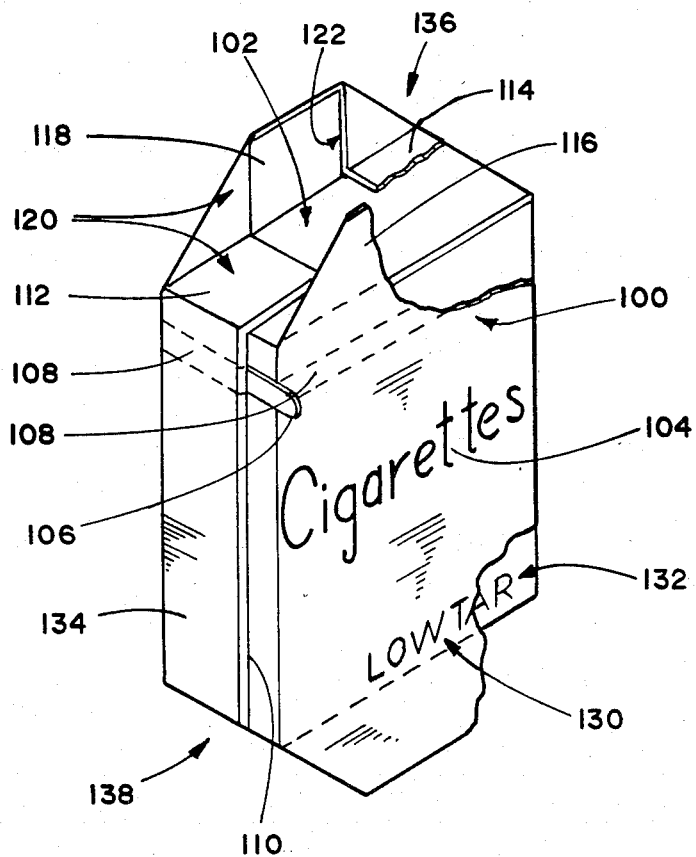
FIG. 2 is a top perspective view of a package of cigarettes wherein the package is overwrapped with a barrier laminate of the invention.

FIG. 2 illustrates an overwrap barrier sealed package of cigarettes according to the invention. Partially sealed overwrap 100 overlies hard or soft interior package 102. Overwrap 100 preferably includes an underlying reverse print layer so that printing 104 is visible from the exterior of the package. A tear tape pull tab 106 is provided for tear tape 108 which is coupled to the interior surface of the overwrap for opening of the overwrap. The overwrap is substantially fully sealed in the same manner as the current cigarette overwrap, including a longitudinal side seal 110 wherein the interior surface of the overwrap is sealed to the exterior surface of the overwrap. Left and right side tucks 112 and 114, respectively, are folded inwardly against the interior of package 102. Thereupon, front and back end flaps 116 and 118, respectively, are folded over and the entire folded top surface exposed to heat and pressure to form the fully sealed top surface which is substantially the same as illustrated in FIG. 1.

It will be recognized that in order to form an impervious seal, the top folded end flap structure illustrated in FIG. 2 will include exterior to exterior surface fusion heat seals such as between the surfaces illustrated at 120; interior to interior surface fusion heat seals such as between the interior surfaces shown in the direction of arrow 122; and exterior surface to interior surface seals such as between the exterior surface of front end flap 116 and the interior surface of rear end flap 118. In other words, heat sealing of the folded surfaces shown at the top of FIG. 2 to provide the fully heat sealed surface shown at the top of FIG. 1 best involves interior to interior, interior to exterior, and exterior to exterior heat seals.

As heat sealing is preferably performed by application of heat to a fully folded top surface such as shown at the top of FIG. 1, it is thus important that the overwrap barrier laminate be heat conductive so that sufficient heat can pass through as many as five overlapped barrier layers to provide substantial fusion heat sealing between all surfaces thereof. In this regard, it will be recognized that when fully folded and heat sealed, two layers of back flap 118 will overlie two layers of front flap 116, which together will overlie side tuck 112, and all exterior and interior adjacent surfaces of the barrier laminate should be fusion heat sealed to one another. The bottom of the package shown in FIG. 2 is substantially the same as the top thereof.

Figure 2A:
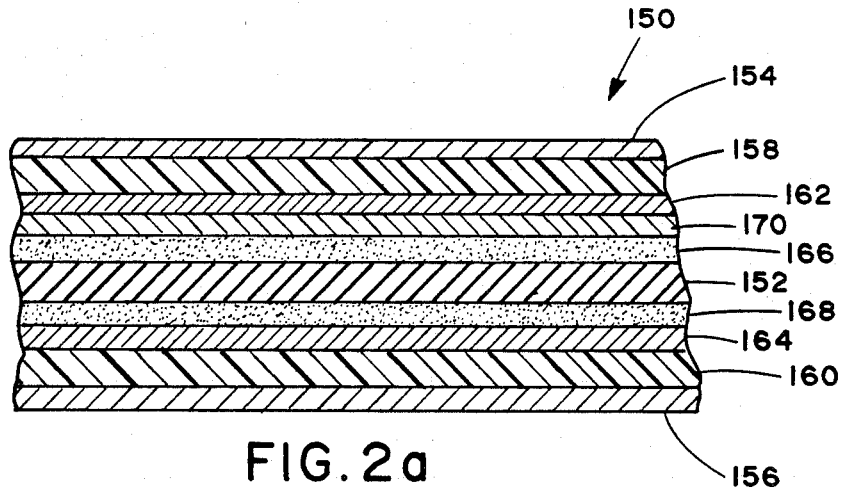
FIG. 2A is a cross sectional view of the overwrap laminate used in the package of FIG. 2.

FIG. 2A illustrates a cross sectional view of the barrier laminate used in the cigarette barrier package of #FIG. 2. Barrier laminate 150 includes central foil layer 152 and interior and exterior ultrathin fusion heat sealable thermoplastic layers 154 and 156. Adjacent the interior and #exterior skin layers, respectively, are biaxially oriented polypropylene homopolymer layers 158 and 160, respectively. Adjacent polypropylene layers 158 and 160 are, respectively, adhesion promoter layers 162 and 164. Adhesive layers 166 and 168, respectively, couple polypropylene layer 158 and 160 to foil layer 152. A reverse print layer 170 is located on the exterior side of central foil layer 152 below oriented polypropylene layer 158 to provide print 104 (FIG. 2) on the package shown in FIG. 2.

Adhesion promoter layer 162 of the barrier laminate 150 shown in FIG. 2A is advantageously selected for promoting adherence of ink layer 170 to polyolefin layer 158. In addition, adhesion promoter layer 162 must be optically clear so that printed indicia 104 (FIG. 2) can be viewed from the outside of the final package. One preferred thermoplastic material which may be used as adhesion promoter layer 162 is ethylene vinyl acetate. Other preferred materials can include ethylene-propylene co- or ter-polymers, EVA, EAA, EMA, maleic anhydride grafted polymers, and the like. Similarly, the polypropylene/polyethylene copolymer used for layer 62 in the barrier laminate 50 shown in FIG. 1A can also be used. However, ethylene vinyl acetate is preferred because of excellent ink adhesion to ethylene vinyl acetate; thus, stress on laminate 150 will not cause the ink to delaminate from the polypropylene layer 150 resulting in an overwrap with poor appearance.

With reference again to FIG. 2, the overwrapped package of FIG. 2 is preferably constructed so that inner package 102 and outer overwrap 100 are both printed and so that overwrap 100 is aligned with package 102 to provide accurate registration of the printed surfaces. Thus, with reference to FIG. 2, printing 130 is in exact registration with underlying printing 132 so that when all or a portion of the overwrap 100 is removed from the underlying package 102, the overwrap printing matches exactly the printing of the underlying package.

The overwrap and inner liner packages of the present invention are designed to be compatible with current cigarette processing operations and to have appearance comparable to current cigarette packages. In addition, the #laminate and overall package are designed so that they can be used in conjunction with modified current cigarette equipment.

In this regard, the overwrapped package shown in FIG. 2 can be prepared using laminate 150 (FIG. 2A) using a modified G.D. 4350 overwrapping apparatus (G.D. SOCIETA PER AZIONI; Bologna, Italy). The GD 4350 is designed to use film having a thickness of about 1 mil and includes a wheel having six operative radial slots for receiving a cigarette package and an overwrap, folding the overwrap, and heat sealing the sides and ends thereof. In this apparatus, there are two heat sealing stations for sealing side 134 (FIG. 2) of the cigarette package. In the modified apparatus, a third side sealing station is added. Similarly, in this apparatus there are two stations for heat sealing the top 136 and bottom 138 (FIG. 2) of the overwrapped cigarette package. Both top and bottom are heated at each station. In the modified apparatus, there are three heat sealing stations for the top and bottom. Additionally, a registration device is provided at the i feeder for feeding film to the overwrap machine. Thus, printing on the overwrap can be provided in registration with printing on the underlying package.

Similarly, the device for providing sealed inner liner 18 (FIG. 1) is a modified GD "X-2 Packer" which is used for packing cigarettes in crushproof boxes. This device is modified so that the feeder, which normally feeds a i paperboard box blank, now feeds flexible film 50 and also includes a device for feeding and coupling a tear tape to the film. The radially slotted wheel which has six operative stations, is changed to have eight operative 1 stations in the modified version including: a first station for receiving a bundle of typically twenty cigarettes or other smoking articles and a cut inner liner blank which includes a coupled tear tape; a second station wherein sideseam 20 (FIG. 1) is heat sealed a first time; stations 3 and 4 wherein sideseam 20 is heat sealed a second and third time; station 5 wherein top and bottom side tucks and front and back folds are made; and sixth, seventh and eight stations where the folded top and bottom are subjected to successive heat sealing operations.

With reference to the packing and heat sealing operations discussed above, those skilled in the art will recognize that the nature of the exterior and interior skin layers of laminates of the invention, are of great importance. Cigarette packing machines operate at high speeds, i.e., from 100 to 500 packs per minute. It is important that the film be fed at high speeds, not stick to equipment, and not be marred by equipment. Thus, the exterior and interior skin layers (layers 54 and 56 in FIG. 1A and layers 154 and 156 in FIG. 2A) are advantageously composed of a material having all of the following properties; the lowest possible softening point of, for example, about 170°–175° F.; excellent hot tack; excellent slip characteristics; excellent hot slip characteristics; highly scuff resistant and optically clear. Preferably, such materials can include propylene/ethylene copolymers wherein ethylene content is from about 1 to about 4%. A most preferred is a propylene/ethylene copolymer having a softening point of 175° F. and an ethylene content in the range of from about 2 to about 4% by weight.

It will also be recognized that machine requirements require that the laminate properties meet certain requirements. The films provided herein are stiff with good deadfold characteristics. They are thin, i.e., 1.5 to 2.5 mils thick; yet not so thin that the films wrinkle or reveal contours of packaged cigarettes or other smoking articles. The films are preferably symetrical or substantially symetrical and are therefore flat during cutting, heat sealing, feeding and the like. Moreover, it will be recognized that the films provided herein are strong and provide excellent barrier properties for cigarettes and other smoking articles.

EXAMPLE 1

A film for a cigarette package inner liner was prepared having the following layers:

Layer 1, polypropylene/polyethylene copolymer softening point 175° F., thickness 0.07 to 0.1 mil;

Layer 2, polypropylene homopolymer biaxially oriented thickness 0.5 to 0 .56 mil;

Layer 3, polypropylene/polyethylene copolymer softening point 175° F. thickness 0.07 to 0.1 mil;

Layer 4, adhesive consisting of polyurethane;

Layer 5, aluminum foil having a thickness of, 285 mils;

Layer 6, adhesive consisting of polyurethane;

Layer 7, polypropylene/polyethylene copolymer having a softening point of 175° F. and a thickness of 0.07 to 0.1 mil;

Layer 8, polypropylene homopolymer biaxially oriented having a thickness of 0.5 to 0.56 mil;

Layer 9, polypropylene/polyethylene copolymer having a softening point of 175° F. and a thickness of 0.07 to 0.1 mil.

Cigarettes are packaged in the inner liner described above by the modified GDX-2 packer described previously. The packages are stored under 90° F., 10% Relative Humidity and 85° F., 80% Relative Humidity conditions for period of time up to 6 months. The cigarettes are removed from the package and examined. It is found that moisture content is acceptable.

In a like manner, cigarettes of the type described in U.S. patent application 791,721 filed Oct. 28, 1985, by Clearman et al, and assigned to R. J. Reynolds Tobacco Company, are packaged in the same manner. The packages are stored under the same conditions as described above for the same periods of time and it is found that moisture content of the cigarettes remains acceptable.

EXAMPLE 2

A barrier overwrap is prepared having the following layers from outside to inside:

Layer 1, polypropylene/polyethylene copolymer having a softening point of 175° F. and a thickness of about 0.07 mils Layer 2, polypropylene homopolymer biaxially oriented layer having a thickness of about 0.55 mils.

Layer 3, ethylene vinyl acetate having a thickness of about 0.07 mils;

Layer 4, reverse print several colors;

Layer 5, solvent based, curing type adhesive polyurethane;

Layer 6, aluminum foil having a thickness of 0.285 mils;

Layer 7, solventless curing type adhesive polyurethane;

Layer 8, ethylene vinyl acetate having a thickness of about 0.07 mils;

Layer 9, polypropylene homopolymer biaxially oriented having a thickness of about 0.55 mils;

Layer 10, polypropylene/polyethylene copolymer having a softening point of about 175° F. and a thickness of about 0.07 mils.

The above barrier laminate is heat sealable on both outside and inside surfaces. The EVA layers promote adhesion of ink. The solventless, curing type adhesive is used on the product side of the foil barrier to reduce the possibility of any retained solvent from the overwrap being inside the package. Advantageously, the EVA layer is corona treated prior to adhesion to the foil layer.

The manufacturing sequence is essentially as follows: A biaxially oriented three-layer ABC coextrusion comprising: copolymer of polypropylene and polyethylene/polypropylene homopolymer/ethylene vinyl acetate is provided for the top side of the laminate. The film is reverse printed on the EVA side and is not corona treated in line.

Similarly, the same three-layer biaxially oriented coextrusion for the bottom three layers of the final laminate is provided and corona treated on the EVA side of the film. A solventless adhesive is applied to the film and the film laminated to foil. The structure is allowed to cure for 48 hours.

A solvent type thermoplastic adhesive is applied to the foil side of the above provided lamination. The coated lamination is passed through an oven to remove the solvent and then joined to the printed laminate formed previously with warm nip applied to the printed side of the printed film prepared previously. Thereupon, the entire structure is allowed to cure 48 hours to develop adhesive bonding.

When current cigarettes and cigarettes of the type described in the aforesaid Clearman application are packaged inside an unsealed foil layer, which is within a crushproof hard cigarette pack, which in turn is overwrapped by the above-described laminate, it is found that the moisture content of the cigarettes are acceptable after storage under the same time and temperature conditions of example 1.

EXAMPLE 3

The barrier inner liner of Example 1 is employed as a sealed inner liner for packages, each containing twenty cigarillos, in the manner described in Example 1. It is found that the packaged cigarillos maintain satisfactory moisture content for extended periods of time.

The invention has been described in considerable detail with specific reference to preferred embodiments. However, it will be understood that variations and modifications can be made without departing from the spirit and scope of the invention as described in the foregoing specification and defined in the appended claims.

What is claimed is:

1. A packaging laminate for barrier sealed cigarette or other smoking article packages comprising:
   a foil layer;
   exterior and interior surface skin layers of fusion heat-sealable thermoplastic polymer having a softening point between about 165° F. and 190° F., each of said surface layers having a thickness between about 0.05 and 0.1 mils;
   first and second biaxially oriented polypropylene homopolymer layers, said first polypropylene layer located between said exterior skin layer and said foil layer, said second polypropylene homopolymer layer located between said interior skin layer and said foil layer; and
   first and second adhesive layers, said first adhesive layer coupling said first polypropylene layer to said foil layer and said second adhesive layer coupling said second polypropylene layer to said foil layer on the other side thereof;
   said packaging laminate having a thickness of between about 1.5 and 2.5 mils.

2. The packaging laminate defined in claim 1 additionally comprising first and second adhesion promoter layers, said first adhesion promoter layer being adjacent said first polypropylene layer and lying between said first polypropylene layer and said first adhesive layer, said second adhesion promoter layer being adjacent said second polypropylene layer and lying between said second polypropylene layer and said second adhesive layer.

3. The packaging laminate of claims 1 or 2 wherein said exterior and interior skin layers consist of a fusion heat-sealable thermoplastic polymer selected from the group consisting of propylene ethylene random copolymers and terpolymers of propylene, ethylene and a third comonomer.

4. The packaging laminate of claim 3 wherein said fusion heat-sealable thermoplastic material has a softening point of between about 170° F. and 180° F.

5. The packaging laminate of claim 4 wherein the laminate has a thickness of between about 1.75 and 2.25 mils.

6. The packaging laminate of claims 4 or 5 wherein the foil layer has a thickness ranging from about 0.25 to about 0.35 mils.

7. The packaging laminate of claim 2 wherein said laminate additionally includes a reverse print layer between said ethylene vinyl acetate adhesion promoter layer and said first adhesive layer.

8. The packaging laminate of claim 7 herein said first adhesion promoter layer is ethylene vinyl acetate.

9. The packaging laminate of claim 6 wherein said exterior and interior skin layers consist of optically clear propylene/ethylene random copolymer and have a softening point of between about 170° and 180° F.

10. A barrier sealed package of cigarettes or other smoking articles comprising a plurality of said articles sealed within a barrier laminate, said package being of rectangular shape and having an overlapping heat sealed longitudinal side seal and heat sealed overlapping top and bottom folded end flap seals,
    said barrier laminate having a thickness of between about 1.5 and 2.5 mils and comprising:
      a foil layer having a thickness between about 0.25 mils and 0.35 mils;
      exterior and interior surface skin layers of fusion heat-sealable thermoplastic polymer having a softening point between about 165° F. and 190° F., each of said surface layers having a thickness between about 0.05 and 0.1 mils;
      first and second biaxially oriented polypropylene homopolymer layers, said first polypropylene layer located between said exterior said skin layer and said foil layer, said second polypropylene homopolymer layer located between said interior skin layer and said foil layer; and
      first and second adhesive layers, said first adhesive layer coupling said first polypropylene layer to said foil layer and said second adhesive layer coupling said second polypropylene layer to said foil layer on the other side thereof, 11. The barrier sealed package of claim 10 wherein said articles sealed within said laminate comprise cigarettes.

12. The barrier sealed package of claim 10 wherein said articles sealed within said laminate comprise a water sensitive aerosol generating material.

13. The barrier sealed package of claims 11 or 12 wherein said barrier laminate is provided as an overwrap.

14. The barrier sealed package of claims 11 or 12 wherein said barrier laminate is provided as an inner liner.

* * * * *

UNITED STATES PATENT AND TRADEMARK OFFICE
CERTIFICATE OF CORRECTION

PATENT NO. : 4,807,745

DATED : February 28, 1989

INVENTOR(S) : William H. Langley et al.

It is certified that error appears in the above-identified patent and that said Letters Patent is hereby corrected as shown below:

In column 4, line 50, delete the pound symbol (#) in front of "intermediate".
In column 5, line 53, delete the pound symbol (#) in front of "Fig. 2".
In column 5, line 56, delete the pound symbol (#) in front of "exterior".
In column 6, line 31, delete the pound symbol (#) in front of "laminate".
In column 6, line 51, delete the "1" which comes before "feeder".
In column 6, line 59, delete the "1" which comes before "paperboard".
In column 6, line 63, delete the "1" which comes before "stations".
In column 7, line 51, delete the comma after "of" and insert a decimal point before "285".

Signed and Sealed this

Twenty-sixth Day of September, 1989

*Attest:*

DONALD J. QUIGG

*Attesting Officer*   *Commissioner of Patents and Trademarks*